United States Patent
Fiske et al.

(10) Patent No.: US 9,268,785 B2
(45) Date of Patent: *Feb. 23, 2016

(54) PRESERVING REDUNDANCY IN DATA DEDUPLICATION SYSTEMS BY DESIGNATION OF VIRTUAL ADDRESS

(71) Applicant: INTERNATIONAL BUSINESS MACHINES CORPORATION, Armonk, NY (US)

(72) Inventors: Rahul M. Fiske, Pune (IN); Carl E. Jones, Tucson, AZ (US); Subhojit Roy, Pune (IN)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 13/801,510

(22) Filed: Mar. 13, 2013

(65) Prior Publication Data
US 2013/0282674 A1 Oct. 24, 2013

Related U.S. Application Data

(63) Continuation of application No. 13/453,266, filed on Apr. 23, 2012.

(51) Int. Cl.
*G06F 17/30* (2006.01)
*G06F 3/06* (2006.01)

(52) U.S. Cl.
CPC ........ *G06F 17/30156* (2013.01); *G06F 3/0641* (2013.01)

(58) Field of Classification Search
CPC ............................ G06F 3/0641; G06F 3/30156
USPC .......................................................... 707/664
See application file for complete search history.

(56) References Cited

U.S. PATENT DOCUMENTS

| | | | |
|---|---|---|---|
| 7,567,188 B1 * | 7/2009 | Anglin et al. | 341/63 |
| 7,818,495 B2 | 10/2010 | Tanaka et al. | |
| 7,908,436 B1 | 3/2011 | Srinivasan et al. | |
| 8,074,049 B2 | 12/2011 | Gelson et al. | |
| 8,086,799 B2 | 12/2011 | Mondal et al. | |
| 8,117,464 B1 | 2/2012 | Kogelnik | |
| 8,468,138 B1 | 6/2013 | Chhaunker et al. | |
| 8,527,544 B1 | 9/2013 | Colgrove et al. | |
| 8,589,640 B2 | 11/2013 | Colgrove et al. | |
| 2003/0115447 A1 | 6/2003 | Pham et al. | |
| 2004/0111625 A1 | 6/2004 | Duffy et al. | |

(Continued)

FOREIGN PATENT DOCUMENTS

CN 102156727 A 8/2011

OTHER PUBLICATIONS

Wang et al, "Research on Secure De-duplication based on Proxy-Recreation", Dec. 27, 2011, pp. 1-6, Sciencepaper Online.

*Primary Examiner* — Grace Park
(74) *Attorney, Agent, or Firm* — Griffiths & Seaton PLLC

(57) ABSTRACT

Various embodiments for preserving data redundancy of identical data in a data deduplication system in a computing environment are provided. In one embodiment, a method for such preservation is disclosed. A selected range of virtual addresses of a virtual storage device in the computing environment is designated as not subject to a deduplication operation. Other system and computer program product embodiments are disclosed and provide related advantages.

6 Claims, 4 Drawing Sheets

(56) References Cited

U.S. PATENT DOCUMENTS

| | | |
|---|---|---|
| 2006/0230076 A1* | 10/2006 | Gounares et al. .............. 707/200 |
| 2007/0168350 A1 | 7/2007 | Utiger |
| 2008/0244172 A1* | 10/2008 | Kano ........................... 711/112 |
| 2009/0063795 A1 | 3/2009 | Yueh |
| 2009/0268903 A1 | 10/2009 | Bojinov et al. |
| 2009/0271402 A1 | 10/2009 | Srinivasan et al. |
| 2010/0037118 A1 | 2/2010 | Saliba et al. |
| 2010/0070478 A1 | 3/2010 | Anglin |
| 2010/0070715 A1 | 3/2010 | Waltermann et al. |
| 2010/0121825 A1 | 5/2010 | Bates et al. |
| 2010/0250501 A1 | 9/2010 | Mandagere et al. |
| 2010/0268960 A1 | 10/2010 | Moffat et al. |
| 2010/0299311 A1 | 11/2010 | Anglin et al. |
| 2010/0306412 A1 | 12/2010 | Therrien et al. |
| 2010/0313036 A1 | 12/2010 | Lumb |
| 2010/0313040 A1 | 12/2010 | Lumb |
| 2011/0022718 A1 | 1/2011 | Evans et al. |
| 2011/0029739 A1* | 2/2011 | Nakajima et al. ............. 711/154 |
| 2011/0035541 A1 | 2/2011 | Tanaka et al. |
| 2011/0066628 A1 | 3/2011 | Jayaraman |
| 2011/0145207 A1 | 6/2011 | Agrawal et al. |
| 2011/0145576 A1 | 6/2011 | Bettan |
| 2011/0225130 A1 | 9/2011 | Tokoro |
| 2011/0225214 A1 | 9/2011 | Guo |
| 2011/0238634 A1 | 9/2011 | Kobara |
| 2011/0238635 A1 | 9/2011 | Leppard |
| 2011/0239097 A1 | 9/2011 | Bates et al. |
| 2011/0258398 A1 | 10/2011 | Saliba et al. |
| 2012/0017043 A1* | 1/2012 | Aizman et al. ................ 711/114 |
| 2012/0072654 A1 | 3/2012 | Olbrich et al. |
| 2012/0089574 A1 | 4/2012 | Doerner |
| 2012/0095968 A1* | 4/2012 | Gold ............................ 707/652 |
| 2012/0317084 A1 | 12/2012 | Liu |
| 2013/0086006 A1 | 4/2013 | Colgrove et al. |
| 2013/0097380 A1 | 4/2013 | Colgrove et al. |
| 2013/0144846 A1 | 6/2013 | Chhaunker et al. |
| 2013/0262404 A1 | 10/2013 | Daga et al. |
| 2013/0262753 A1 | 10/2013 | Prins et al. |

* cited by examiner

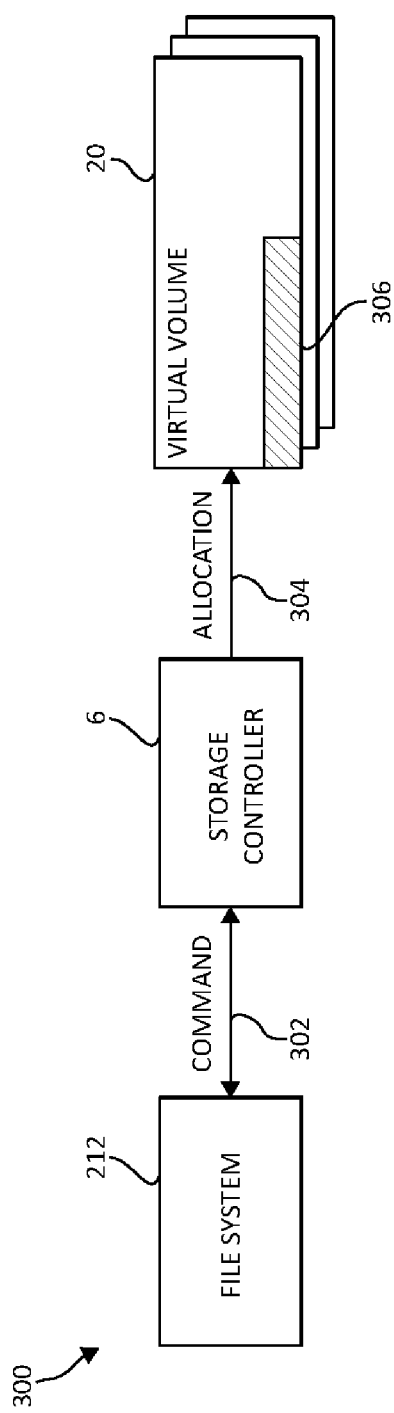
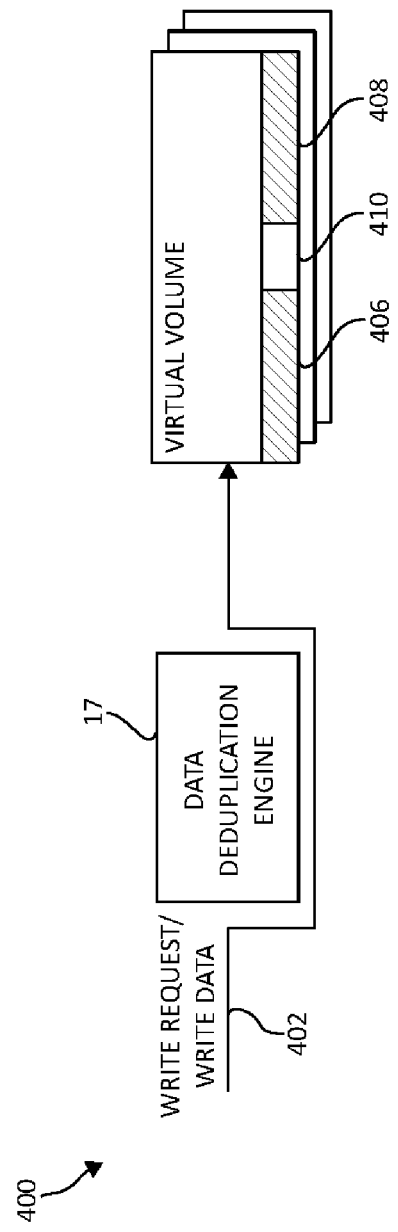

PRESERVING REDUNDANCY IN DATA DEDUPLICATION SYSTEMS BY DESIGNATION OF VIRTUAL ADDRESS

CROSS REFERENCE TO RELATED APPLICATIONS

This application is a Continuation of U.S. patent application Ser. No. 13/453,266, filed on Apr. 23, 2012.

FIELD OF THE INVENTION

The present invention relates in general to computers, and more particularly to a method, system, and computer program product for preserving redundancy and other data security characteristics in computing environments in which data deduplication systems are incorporated.

DESCRIPTION OF THE RELATED ART

Computers and computer systems are found in a variety of settings in today's society. Computing environments and networks may be found at home, at work, at school, in government, and in other settings. Computing environments increasingly store data in one or more storage environments, which in many cases are remote from the local interface presented to a user.

These computing storage environments may use many storage devices such as disk drives, often working in concert, to store, retrieve, and update a large body of data, which may then be provided to a host computer requesting or sending the data. In some cases, a number of data storage subsystems are collectively managed as a single data storage system. These subsystems may be managed by host "sysplex" (system complex) configurations that combine several processing units or clusters of processing units. In this way, multi-tiered/multi-system computing environments, often including a variety of types of storage devices, may be used to organize and process large quantities of data.

SUMMARY OF THE INVENTION

Many multi-tiered/multi-system computing environments implement data deduplication technologies to improve storage performance by reducing the amount of duplicated storage across storage devices. Data deduplication systems are increasingly utilized because they help reduce the total amount of physical storage that is required to store data. This reduction is accomplished by ensuring that duplicate data is not stored multiple times. Instead, for example, if a chunk of data matches with an already stored chunk of data, a pointer to the original data is stored in the virtual storage map instead of allocating new physical storage space for the new chunk of data.

In certain situations, however, the behavior of deduplication may go against the redundancy requirements of a hosted application, for example, or a storage policy, or other requirements. A need exists for a mechanism whereby data having redundancy requirements is safeguarded, yet the benefits of deduplication systems are not diminished, by allowing deduplication to occur for remaining data that do not have such requirements.

In view of the foregoing, various embodiments for preserving data redundancy of identical data in data deduplication systems are disclosed. In one embodiment, by way of example only, a method for such preservation is disclosed. A selected range of virtual addresses of a virtual storage device in the computing environment is designated as not subject to a deduplication operation. Accordingly, any write to this selected address range will not be subject to deduplication.

In addition to the foregoing exemplary embodiment, various additional embodiments are provided and supply related advantages.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 3 is a block diagram of various aspects of functionality of the present invention as illustrated in an exemplary flow;

FIG. 4 is a block diagram of additional various aspects of functionality of the present invention, again as illustrated in an exemplary flow;

DETAILED DESCRIPTION OF THE DRAWINGS

Figure 1:
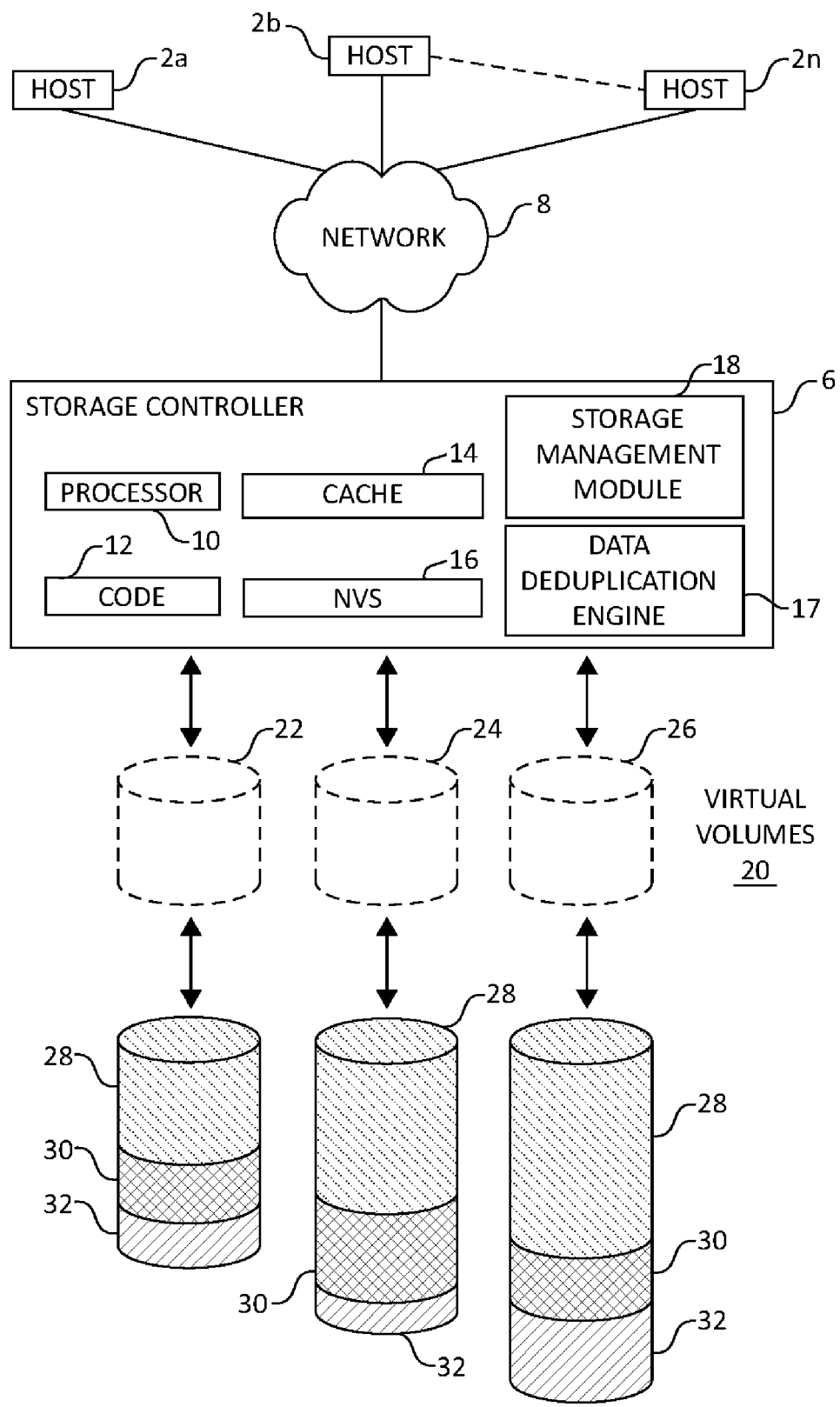
FIG. 1 is a block diagram showing a hardware structure of a data storage system, in which aspects of the present invention may be implemented.

Data deduplication in storage controllers typically works "behind the scene" of an application, and may sometimes operate contrary to the interests of the application when deduplication operations are performed against the needs of the application. This situation may arise if an application writes multiple copies of the same data, and intends to retain multiple physical copies, while the deduplication subsystem (deduplication engine) finds these matching copies and ends up deduplicating the copies while storing the data. This can be detrimental to the application, which expects to find multiple copies at various locations, and is made to believe that it has done so by the storage subsystem, but in reality only a single copy of the data has been written.

Consider the following example. File systems usually prefer to write multiple physical copies of the "Superblock," or a segment of metadata describing the file system on a block-based storage device, (or other metadata information) on a virtual disk to ensure redundancy. Since the contents of the Superblock are the same, data deduplication would result in retaining a single, physical copy of the Superblock and point multiple virtual addresses to the same physical block. This situation is highly inadvisable, because the loss of a single block on the physical copy of the Superblock may render the file system totally unusable, as there are no redundant copies of the Superblock. Even though these deduplicated copies maybe written to redundant storage (example: a 2-way or 3-way mirror volume), it is still not sufficient because the file-system intended to write the superblock more than twice or thrice because usually the number of Superblock copies stored depends on the size of the file-system. Conventionally, there are no existing methodologies that directly address this problem in data deduplication systems.

Various indirect methodologies may be employed to attempt to address this problem. In one example, the storage pool from which the data deduplication subsystem carves out physical storage can be mirrored (i.e., contains 2 or 3 copies of the same data). Hence multiple redundant copies can be created despite deduplication. However, this is inadequate protection for the application because of the following reasons. First, the application may wish to keep, for example, ten (10) copies of the same data. However, if the storage pool is two-way mirrored, it may only retain a maximum of two (2) copies. Second, since data deduplication carves out physical storage pools that span across large amounts of storage and multiple file systems, it is likely that multiple applications and file systems share the same physical storage pool. Hence it is possible that some critical copies of data (like the Superblock) get physically placed on the same disk, even though they belong to multiple file-systems. Since deduplication would prevent multiple copies of the same data to be written to multiple physical locations, the number of copies of critical data reduces and they can be placed on the same physical disk for multiple file systems. This increases the risk of single failures becoming fatal.

The illustrated embodiments provide multiple mechanisms for addressing the issues discussed previously. One goal of these mechanisms is to ensure that the deduplication subsystem in the storage controller (or wherever it may be located) balances the benefits of reducing the number of copies of data against application requirements for physical allocating multiple copies of critical data. Each of the methodologies described in the following illustrated embodiments may be used in a variety of circumstances and may have attendant benefits specific to those circumstances.

In one such embodiment, when the storage controller (or other storage management device) exposes virtual disks (devices) for use by an owning application, the storage controller is able to create devices with some sections of their entire block address range designated for no deduplication of incoming write commands. The owning application may thereby allocate space from this specific virtual address range in order to store multiple physical copies of identical data. In one embodiment, these address ranges may be spread across the entire virtual address range such that sufficient address range coverage may be achieved.

In view of the described embodiment, by allowing the application to allocate certain data to un-deduplicated storage, and thereby dictate whether a write must be deduplicated, the application is allowed flexibility to implement storage policy associated with the data it generates. This way, the application is in a better position than the deduplication system to determine whether selected data blocks, even though identical, must still be located in separate physical locations. In addition, the storage controller (or other storage management device) continues to perform its role of data reduction by deduplication, and at the same time allows enough control to the owning application to rule out deduplication when required.

By allowing an owning application control to, in effect, designate which data is to forgo data deduplication operations by specifically allocating it as such, very fine-grained control is thereby provided to the application, allowing for flexibility in implementation while still retaining advantages of deduplication functionality and retaining redundancy for key data.

In the following description, reference is made to the accompanying drawings which form a part hereof and which illustrate several embodiments of the present invention. It is understood that other embodiments may be utilized and structural and operational changes may be made without departing from the scope of the present invention.

FIG. 1 illustrates a computing storage environment in which aspects of the invention may be implemented. A plurality of host systems $2a, b \ldots n$ transmit Input/Output (I/O) requests to one or more storage volumes 28, 30, and 32 through a storage controller 6 which manages access to the storage volumes 28, 30, and 32. In certain implementations, the storage volumes may be physically comprised of a plurality of hard disk drives organized as Just a Bunch of disks (JBOD), a RAID array, Direct Access Storage Devices (DASD), SSD, tape devices, etc.

A number of virtual volumes 22, 24, and 26 are presented to the host systems $2a, b \ldots n$ in lieu of presenting a number of physical or logical volumes (often which may be physically configured in a complex relationship). The host systems $2a, b \ldots n$ may communicate with the storage controller 6 over a network 8, such as the Internet, a Storage Area Network (SAN), an Intranet, Local Area Network (LAN), Wide Area Network (WAN), etc., using multiple communication protocols such as TCP/IP, Fibre Channel, Ethernet, etc. at different layers in a protocol stack.

The storage controller 6 includes a processor 10 executing code 12 to perform storage controller operations. The storage controller 6 further includes a cache system 14 and non-volatile storage unit 16, such as a battery backed-up memory device. The storage controller 6 stores in cache 14 data updates received from the hosts $2a, b \ldots n$ to write to the virtual storage volumes 22, 24, and 26 (and thereby to volumes 28, 30, and 32) as well as data read from the volumes 28, 30, and 32 to return to the hosts $2a, b \ldots n$. When operating in Fast Write mode, data updates received from the hosts $2a, b \ldots n$ are copied to both cache 14 and the NVS 16. End status is returned to the host $2a, b \ldots n$ sending the data update after the update is copied to both the cache 14 and NVS 16.

Storage controller 6 also includes a data deduplication engine 17 in communication with a storage management module 18 as will be further described. Data deduplication engine 17 is configured for performing, in conjunction with processor 10, data deduplication operations on write data passed through storage controller 6 to virtual volumes 20 and volumes 28, 30, and 32.

Cache system 14 may include a data frequency index map, or "storage map" for short, which is not shown for purposes of illustrative convenience. In one embodiment, cache system 14 accepts write data from hosts $2a, b \ldots n$ or similar devices, that is then placed in cache memory. Data deduplication engine 17 then tests the write data for duplication in the cache memory and writes an index and frequency for such in the storage map.

FIG. 1, as one of ordinary skill in the art will appreciate, may illustrate a portion of a larger, multi-system/multi-cluster storage environment having a number of interrelated components such as the previously illustrated storage controller 6. As previously indicated, while virtual volumes 22, 24, and 26 are presented to the user via the host systems $2a, b \ldots n$, the underlying physical configuration may take many possible forms. For example, a number of interrelated storage devices in various classes, such as SSD, SATA, HDD, tape, etc. may comprise the storage volumes 28, 30, and 32 depending on a particular configuration.

Figure 2:
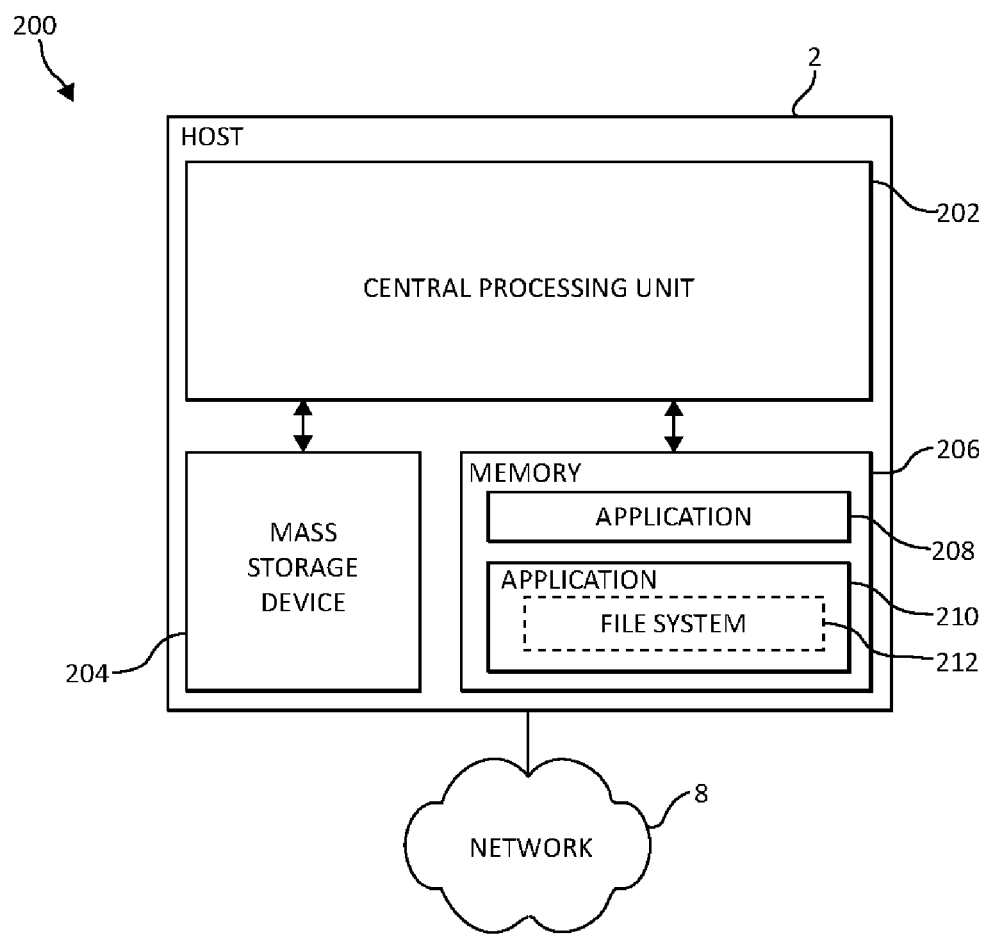
FIG. 2 is a block diagram of an exemplary application and file system, operational in the data storage environment depicted previously in FIG. 1, in which aspects of the present invention may be implemented.

Turning to FIG. 2, an example host computer system 200 is depicted in which aspects of the present invention may be realized. Host computer system 200 includes host 2 as previously depicted in FIG. 1, having central processing unit (CPU) 202, which is connected to mass storage device(s) 204 and memory device 206. Mass storage device 204 may include hard disk drive (HDD) devices, which may be configured in a redundant array of independent disks (RAID).

The storage management operations further described may be executed on memory 206, located in system 200 or elsewhere. Memory device 206 may include such memory as electrically erasable programmable read only memory (EEPROM) or a host of related devices. Memory device 206 and mass storage device 204 are connected to CPU 202 via a signal-bearing medium. In addition, CPU 202 and overall host 2 are connected to communication network 8.

Memory 206 as shown includes an application 208, and an application 210, in which a file system 212 is operational. Application 208 and Application 210 may create, delete, or otherwise manage segments of data, such as data chunks or data blocks, which are physically stored in devices such as mass storage device 204, for example, in storage 28, 30, and 32 as shown in FIG. 1 in a tiered storage arrangement. File system 212 provides a means to organize data expected to be retained after the application program 210 terminates by providing procedures to store, retrieve, and update data, as well as manage the available space on the device(s) that contain it. The file system 212 organizes data in an efficient manner, and is tuned to the specific characteristics of the device (such as computer host 2, CPU 202 and/or memory 206).

In one embodiment, application 208 may be an operating system (OS) 208, or application 210 may be an OS 210, and file system 212 retains a tight coupling between the OS 210 and the file system 212. File system 212 may provide mechanisms to control access to the data and metadata, and may contain mechanisms to ensure data reliability such as those necessary to further certain aspects of the present invention, as one of ordinary skill in the art will appreciate. File system 212 may provide a means for multiple application programs 208, 210 to update data in the same file at nearly the same time.

As previously described, the storage controller 6 (again, FIG. 1) may have an ability to classify portions of virtual volumes (devices) 20, or entire volumes of virtual volumes 20 as free from data deduplication processing. Applications 208, 210, and file system 212 operate in conjunction with the storage controller 6 to allocate this classified storage to selected data segments as will be further described.

In one exemplary embodiment, when virtual devices 20 are created on the storage controller 6, the computing administrator may specify various sizes of the Logical Block Address (LBA) range/ranges on the virtual device(s) 20 where data deduplication must not be performed. As a result, any write addressed to this/these specific virtual address ranges are written to physical disk. An attempt to deduplicate data by matching with earlier data is not performed for those write operations falling within these designated LBA ranges.

The computing administrator may choose to let the storage controller 6 internally determine whether the virtual address range to forgo data deduplication operations is a single, contiguous range, or whether the range is divided into multiple discontiguous pieces spread evenly across the entire address range of the virtual device 20. In one embodiment, the virtual address space(s) that are designated by the storage controller as "no dedup" may be chosen by the storage controller such that they lie on different physical disks, for example. The choice of virtual address range may be performed intelligently by the storage controller such that these ranges are distributed across fault domains, for example.

While discovering the above virtual device 20 that is created by the storage controller 6, the range of block addresses may be conveyed to the owning application by means of a special Small Computing System Interface (SCSI) command. In one embodiment, this command may be a Mode Sense command or a unique page of the Inquiry command. Other techniques will be apparent to one of ordinary skill in the art.

Once the application 208, 210 or file system 212 comes to know the block address ranges described previously, the application 208, 210 or file system 212 may allocate space from these selected ranges for those data segments where deduplication is not needed (e.g., the Superblock). This way, multiple copies of identical data blocks may be stored by the owning application when the owning application issues write commands to these special address ranges.

Turning now to FIG. 3, a block diagram of various functional aspects of the present invention are depicted as an exemplary flow 300. In the depicted embodiment, the file system 212 issues a command 302 (such as a SCSI command previously mentioned) to the storage controller 6 to convey a range of addresses available that have been designated to forgo data deduplication operations. As previously mentioned, the range of virtual addresses may be on differing physical disks or may vary as one of ordinary skill in the art will appreciate. The storage controller 6 in turn allocates 304 a portion 306 of the virtual volume 20 as shown.

In FIG. 4, following, the file system has now issued a write command to physically write the selected data (write request/write data 402) to the designated virtual address range(s). The write request and accompanying write data 402 bypass the deduplication engine without any deduplication operations performed thereon (such as fingerprint match functionality and other operations known to one of ordinary skill in the art), and the selected data is written to the virtual volume as segments 406, and 408 (and ultimately written to physical disk corresponding to those ranges). Virtual volume segments 406 and 408 are not contiguous as shown (they are separated by segment 410). In another embodiment, the storage controller 6 may determine whether to write the selected data to the allocated storage in a contiguous or non-contiguous segment.

Figure 5:
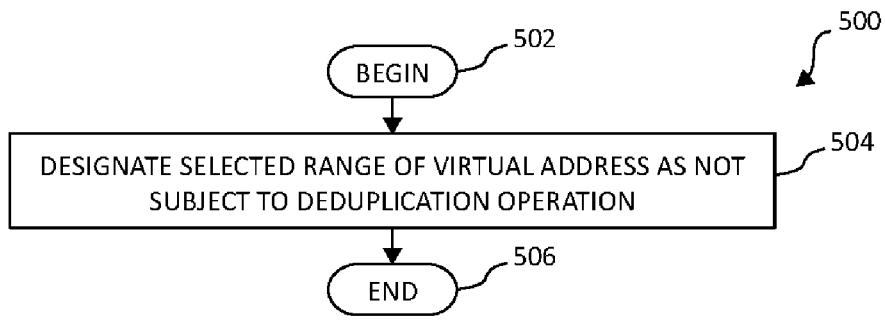
FIG. 5 is an exemplary method for ensuring redundancy in data deduplication systems according to the present invention.

FIG. 5, following, is a flow chart diagram of an exemplary method 500 for ensuring data redundancy in storage subsystems having data deduplication systems, in which aspects of the present invention may be implemented. Method 500 begins (step 502) by designating one or more selected ranges of a virtual address (such as a LBA range) on a virtual device as not subject to a deduplication operation. The method 500 then ends (step 506).

Figure 6:
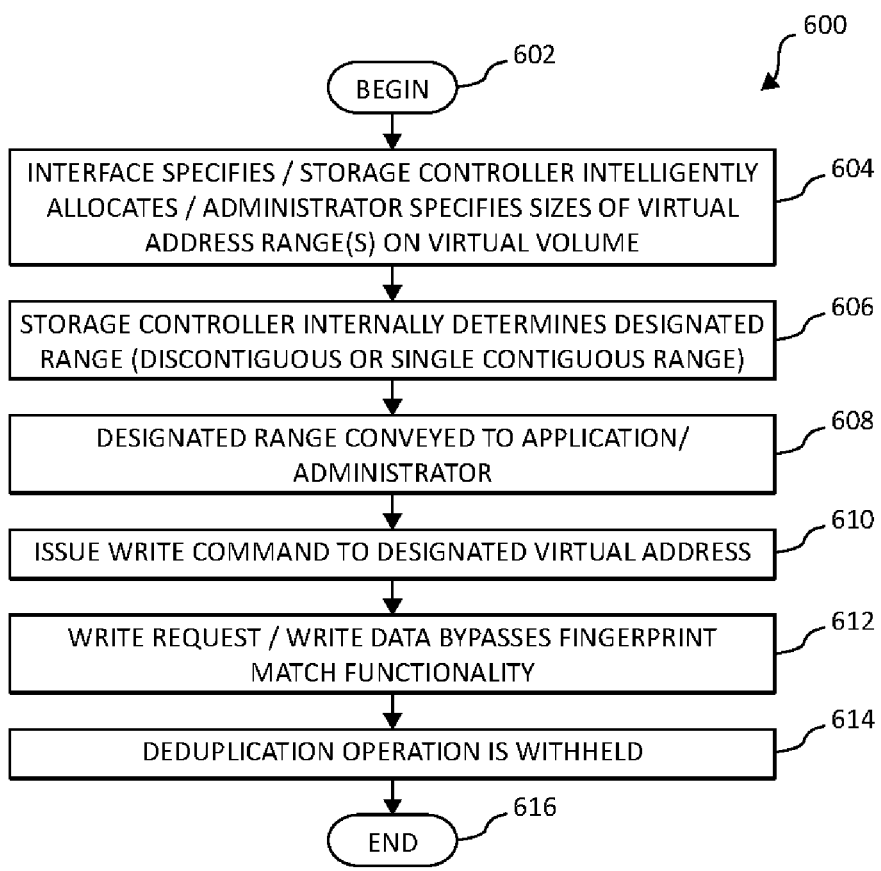
FIG. 6 is an exemplary method for processing data in which aspects of the present invention may be implemented.

FIG. 6, following, is an additional flow chart diagram of an exemplary method 600 for data processing, here again in which aspects of the present invention may be implemented. Method 600 begins (step 602) by one of three possibilities. First, an interface between system and administrator may facilitate the aforementioned virtual address selection. Second, the storage controller may intelligently allocate virtual address ranges in order to meet certain storage needs or address varying conditions that are found at a particular time in the storage environment. This decision may be based on internal knowledge about how portions of the virtual addresses are allocated across different physical storage media. As previously mentioned, for example, the storage controller may intelligently allocate virtual addresses such that the ranges are not distributed across fault domains. Third, the storage administrator herself may selectively choose certain virtual address ranges. In any event, each selection results in a designation of those virtual addresses (and corresponding physical storage) as being exempt from deduplication operations performed thereon.

As a following step, a write command is then issued to the designated virtual address range (step 610). The write data bypasses the deduplication system to the allocated storage in the virtual volume(s) (step 612), and deduplication operations are accordingly withheld from being performed (step 614). The method 600 then ends (step 614).

As will be appreciated by one of ordinary skill in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," "process" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, or entirely on the remote computer or server. In the last scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While one or more embodiments of the present invention have been illustrated in detail, one of ordinary skill in the art will appreciate that modifications and adaptations to those embodiments may be made without departing from the scope of the present invention as set forth in the following claims.

What is claimed is:

1. A method for preserving data redundancy of identical data in a data deduplication system comprising a storage device coupleable to a host computing device including a host application, the storage device comprising a virtual storage device comprising a plurality of virtual addresses, and a storage controller coupled to the storage device and operable in a computing environment, comprising:

selecting a first physical disk for a first range of virtual addresses in the virtual storage device;

selecting a second physical disk for a second range of virtual addresses in the virtual storage device;

implementing, by the storage controller a general storage policy including a deduplication operation for preventing multiple copies of the same data from being stored;

designating, by the storage controller, the first range of virtual addresses and the second range of virtual addresses as not capable of being subject to the deduplication operation;

designating, by the storage controller, a remainder of the virtual addresses in the virtual storage device as subject to the deduplication operation;

generating, by the host application, a plurality of data blocks;

implementing, by the host application, a specific storage policy for each respective data block generated by the host application so that at least a portion of the data blocks generated by the host application are not subject to the general storage policy, each new storage policy implemented by:

determining an importance of each generated data block, determining whether to store each respective data block in one or more of the first range of virtual addresses, the second range of virtual addresses, and the remainder of the virtual addresses based on the importance of each respective data block, storing important data blocks to one or more of the first range of virtual addresses and the second range of virtual addresses so that the data blocks generated by the host application and stored in the first range of virtual addresses and the second range of virtual addresses are not subject to data deduplication, and storing non-important data blocks to the remainder of the virtual addresses so that the data blocks generated by and stored in the remainder of the virtual addresses are subject to data deduplication.

2. The method of claim 1, further including processing data to be written to the first range and the second range to bypass the data deduplication system such that the deduplication operation is withheld from being performed on the important data blocks.

3. The method of claim 2, wherein processing data includes issuing a write command to an allocated portion of the first range and the second range.

4. The method of claim 2, further including, pursuant to the processing data, performing at least one of:

discovering the first range and the second range, and conveying the discovered ranges to an application operational in the computing environment by means of a command.

5. The method of claim 1, wherein designating the first range and the second range further includes specifying a size of the first range and the second range to be designated by one of at least one of an application operational in the computing environment and an administrator.

6. The method of claim 1, further including intelligently determining, by the storage controller, whether the first range and the second range must be contiguous or dis-contiguous, the intelligent determination based on internal knowledge of how portions of the virtual address are allocated across differing physical storage media.

* * * * *